United States Patent

Hoehn et al.

[11] 3,925,388
[45] Dec. 9, 1975

[54] 4-PIPERAZINO-[3,4-B]PYRIDINE-5-CARBOXYLIC ACIDS AND ESTERS

[75] Inventors: Hans Hoehn, Tegernheim; Theodor Denzel, Regensburg, both of Germany

[73] Assignee: E. R. Squibb & Sons, Inc., Princeton, N.J.

[22] Filed: June 11, 1973

[21] Appl. No.: 368,561

Related U.S. Application Data

[60] Division of Ser. No. 169,536, Aug. 5, 1971, Pat. No. 3,755,340, which is a continuation-in-part of Ser. No. 41,568, May 28, 1970, abandoned.

[52] U.S. Cl. ................... 260/268 BC; 260/250 A; 260/256.4 R; 260/293.6; 260/294.8 C; 260/295.5 B; 424/250
[51] Int. Cl.² ................................. C07D 295/12
[58] Field of Search .......................... 260/268 BC Primary Examiner—Raymond V. Rush
Assistant Examiner—Jose Tovar
Attorney, Agent, or Firm—Lawrence S. Levinson; Merle J. Smith

[57] ABSTRACT

New amino derivatives of pyrazolo[3,4-b]pyridine-5-carboxylic acids and esters have the general formula

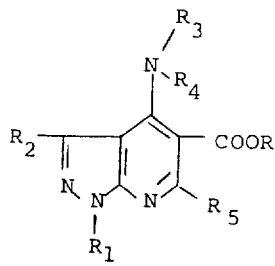

They are useful as ataractic, analgesic and anti-inflammatory agents. In addition, the new compounds increase the intracellular concentration of adenosine-3',5'-cyclic monophosphate.

10 Claims, No Drawings

4-PIPERAZINO-[3,4-B]PYRIDINE-5-CARBOXYLIC ACIDS AND ESTERS

This application is a division of application Ser. No. 169,536, filed Aug. 5, 1971, now U.S. Pat. No. 3,755,340, issued Aug. 28, 1973, which is in turn a continuation-in-part of application Ser. No. 41,568 filed May 28, 1970, now abandoned.

SUMMARY OF THE INVENTION

This invention relates to new amino derivatives of pyrazolo[3,4-b]pyridine-5-carboxylic acids, their esters and salts of these compounds as well as processes for producing them. These new compounds have the formula (I)

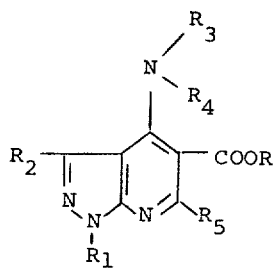

The symbols have the following meanings in formula I and throughout this specification. R is hydrogen or alkyl up to 12 carbon atoms, $R_1$ is hydrogen, lower alkyl, phenyl, phenyl-lower alkyl, benzoyl or substituted benzoyl, $R_2$ is hydrogen, phenyl or lower alkyl. The basic nitrogen group

is an acyclic amino group wherein $R_3$ and $R_4$ each is hydrogen, lower alkyl, lower alkenyl, lower alkanoyl, phenyl, substituted phenyl (i.e., the phenyl ring contains one or two simple substituents including lower alkyl, halogen, trifluoromethyl, amino or carboxy, preferably only one of the latter three substituents), phenyl-lower alkyl, di-lower alkylamino-lower alkyl, benzoyl, substituted benzoyl, phenyl-lower alkanoyl, substituted phenyl-lower alkanoyl, alkanesulfonyl, benzenesulfonyl or substituted benzenesulfonyl, the substituents on the phenyl groups being the same as above (preferably only one of the last groups). This basic group may also form a heterocyclic of 5- or 6- members in which an additional nitrogen is present, i.e., the pyrrolidino, piperidino, pyrazolyl, pyrimidinyl, pyridazinyl, dihydropyridazinyl or piperazinyl radicals, each of which may also bear as a substituent a hydroxy-lower alkyl group or one or two lower alkyl groups. That is to say, $R_3$ and $R_4$ each is hydrogen, lower alkyl, $R_6$, $R_7$-phenyl (wherein $R_6$ and $R_7$ each is hydrogen, halogen, lower alkyl, amino, trifluoromethyl or carboxy), phenyl-lower alkyl, $R_6$, $R_7$-phenyl-lower alkyl, di-lower alkylamino-lower alkyl, benzoyl, $R_6$, $R_7$-benzoyl, phenyl-lower alkanoyl, $R_6$, $R_7$-phenyl-lower alkanoyl, lower alkylsulfonyl, benzenesulfonyl, $R_6$, $R_7$-benzenesulfonyl or $R_3$ and $R_4$ together with the nitrogen to which they are attached form one of the heterocyclics mentioned above or the $R_8$-monosubstituted or $R_8$, $R_9$-disubstituted derivative (wherein $R_8$ and $R_9$ are lower alkyl or hydroxy-lower alkyl). $R_5$ is hydrogen, lower alkyl, phenyl, substituted phenyl, phenyl-lower alkyl and substituted phenyl-lower alkyl.

The lower alkyl groups in any of the foregoing radicals are straight or branched chain hydrocarbon groups of up to seven carbon atoms like methyl, ethyl, propyl, isopropyl, butyl, t-butyl and the like. The lower alkenyl are similar groups with one double bond. In the case of R, the alkyl group is of the same type having up to 12 carbon atoms.

All four halogens are contemplated but chlorine and bromine are preferred.

The lower alkanoyl groups are the acyl groups of the lower fatty acids.

The products of the examples, which are representative of the various compounds of this invention, constitute preferred embodiments. Preferably $R_4$ is hydrogen, particularly when $R_3$ includes a cyclic substituent. Especially preferred compounds of formula I are those wherein R is hydrogen or lower alkyl, especially ethyl, $R_1$ is hydrogen, methyl, ethyl or butyl, $R_2$ is hydrogen or methyl, $R_3$ is ethyl, propyl or butyl, $R_4$ is hydrogen or ethyl and $R_5$ is hydrogen or lower alkyl, especially methyl.

Detailed Description

The new compounds of formula I may be produced by several methods.

A. According to one procedure, when $R_1$ is other than hydrogen, a product of formula I may be produced from compounds of the formula (II)

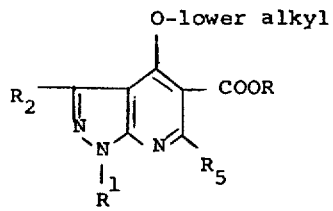

or from compounds of the formula (III)

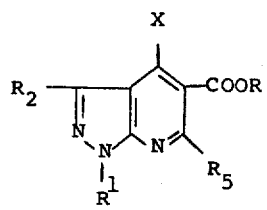

wherein X is chlorine or bromine.

The compounds of formula II are produced by the method described in copending U.S. application Ser. No. 833,672, filed June 16, 1969, now abandoned i.e., producing a 5-aminopyrazole of the formula (IV)

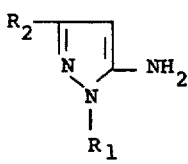

by ring closure of an aldehyde or ketone hydrazone of the formula (V)

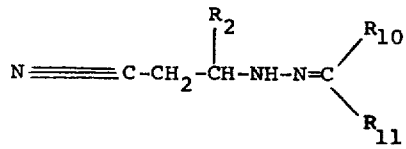

wherein $R_{10}$ and $R_{11}$ each is hydrogen, lower alkyl, phenyl or phenyl-lower alkyl. This is effected by heating at a temperature of about 90° to 130°C. in an inert liquid solvent like butanol or ethanol preferably in the presence of an alkali metal alcoholate catalyst.

The 5-aminopyrazole of formula IV is made to react with an alkoxymethylene malonic acid ester of the formula (VI)

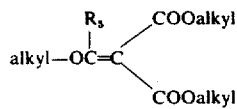

by heating at a temperature of about 120°C.

The resulting compound of the formula (VII)

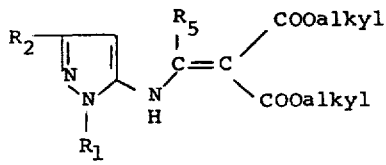

is cyclized in an inert organic solvent such as diphenyl ether at about 230° to 260°C. while distilling off the alcohol formed, producing a compound of formula II with a hydroxy group in the 4-position instead of the O-lower alkyl group. This is then alkylated by treatment with an alkyl halide in an inert organic solvent like dimethylformamide in the presence of an alkali metal carbonate to obtain a compound of formula II.

Instead of alkylating the 4-hydroxy compound referred to above, this 4-hydroxy compound may be refluxed for several hours with a phosphorus halide like phosphorus oxychloride to obtain the intermediate of formula III.

Alternatively, instead of cyclizing the malonic acid ethyl ester compound of formula VII in an inert organic solvent at about 230° to 260° as described above, this product also undergoes cyclization by treatment with phosphorous oxychloride producing directly the intermediate for formula III.

Derivatives of formula I in which $R_5$ is other than hydrogen may also be prepared by reacting a 5-aminopyrazole of formula IV with an acyl malonic acid ethyl ester of the formula (VIa)

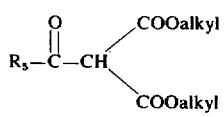

at a temperature of about 110°–130° in the presence of polyphosphorous acid.

The products of formula I are then produced from either of the compounds of formula II or formula III by reaction with the appropriate primary or secondary amine of the formula (VIII)

This reaction is effected by treating the reactants either at room or elevated temperatures. For some cases it may be advantageous to make use of an autoclave.

B. According to a modification of the foregoing procedure, a product of formula I wherein $R_1$ is hydrogen may be produced. By this modification, a 5-aminopyrazole of formula IV wherein $R_1$ is an arylmethyl group or a heteromethyl group is used. This starting material has the formula (IVa)

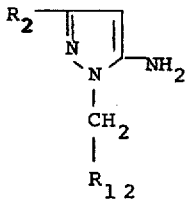

wherein $R_{12}$ is an aromatic or heterocyclic nucleus like phenyl, naphthyl, furyl, pyridyl, pyrimidyl, pyrazinyl or the like.

This material is processed as described above through the reaction with the alkoxymethylene malonic acid ester of formula VI, cyclization of the product corresponding to formula VII to obtain a compound of formula II, with a hydroxy group in the 4-position instead of the O-lower alkyl group, and then alkylating to obtain a compound of formula II.

At this point, the compound of formula II having in the 1-position the $-CH_2-R_{12}$ substituent of formula IVa is oxidized with an oxidizing agent like selenium dioxide in a high boiling solvent like diethyleneglycol dimethylether at about 160°C. This yields a compound of formula II wherein $R_1$ is hydrogen and this product may be treated with the primary or secondary amine as described above.

Instead of alkylating the compound of formula II with the 4-hydroxy group, this may first be oxidized to remove the 1-substituent and then alkylated in the 4-position.

C. According to another method, a product of formula I wherein $R_1$ is hydrogen or other than hydrogen may be produced by cyclizing with an unsubstitued or substituted hydrazine of the formula (IX) 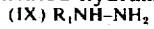 $R_1NH-NH_2$ a 4-amino-2-halo-5-alkoxycarbonylpyridine of formula X or formula XI:

(X)

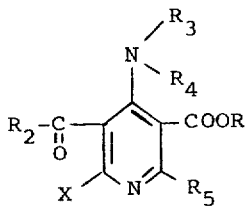

(XI)

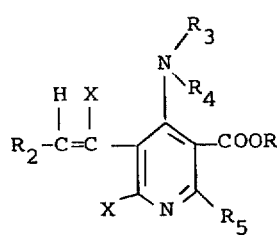

X is a halogen, preferably chlorine or bromine, and the other symbols have the same meaning defined initially.

This reaction takes place in an organic solvent like alcohol, preferably at an elevated temperature.

The starting materials for the above synthesis are produced by the following series of reactions.

A 5-aminoisoxazole of the formula (XII)

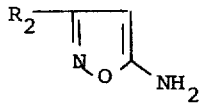

[produced by reacting 3-iminobutyronitrile with hydroxylamine by the procedure described in Ann. Chem. 624, 22 (1959)] is made to react with an alkoxymethylene malonic acid ester of the same formula as VI above by heating at a temperature of about 120°C.

The resulting compound of the formula (XIII)

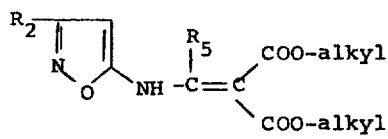

is cyclized in an inert organic solvent, under the same conditions as the compound of formula VII above is treated, similarly producing a compound of formula (XIV)

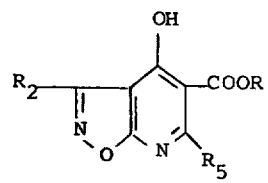

with a hydroxy group in the 4-position. This is then similarly alkylated by treatment with an alkyl halide in an inert organic solvent like dimethylformamide in the presence of an alkali metal carbonate to obtain a compound of formula (XV)

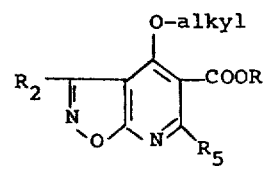

The 4-hydroxy compound in this series too, instead of being alkylated may be refluxed for several hours with a phosphorus halide like phosphorus oxychloride to obtain the intermediate of formula (XVI)

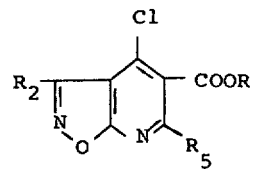

Alternatively, instead of cyclizing the malonic acid ethyl ester compound of formula XIII in an inert organic solvent at about 230° to 260°C., this product also undergoes cyclization by means of phosphorus oxychloride producing directly the intermediate of formula XVI.

The intermediate of formula XV or of formula XVI is then made to react with the appropriate primary or secondary amine of formula VIII above under the same conditions.

This reaction yields a compound of the formula (XVII)

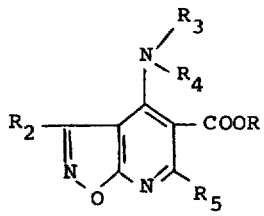

The compound of formula XVII is then hydrogenated with a catalyst like Pd on charcoal in an organic solvent like acetic acid to form a compound of the formula (XVIII)

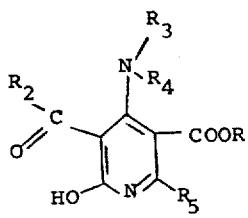

Treatment of the compound of formula XVIII with a phosphorus oxyhalide like phosphorus oxychloride or oxybromide in an organic solvent like benzene yields a compound of formula X or more vigorous treatment of the compound of formula XVIII in a base like pyridine yields a compound of formula XI. Treatment of either of these intermediates with a hydrazine, as described above, yields the new products of formula I.

The compounds of formula I form salts which are also part of this invention. The salts include acid-addition salts, particularly the non-toxic, physiologically acceptable members. The bases of formula I form salts by reaction with a variety of inorganic or organic acids providing acid addition salts including, for example, hydrohalides (especially hydrochloride and hydrobromide), sulfate, nitrate, borate, phosphate, oxalate, tartrate, malate, citrate, acetate, ascorbate, succinate, benzenesulfonate, methanesulfonate, cyclohexanesulfamate and toluenesulfonate. The acid addition salts frequently provide a convenient means for isolating the product, e.g., by forming and precipitating the salt in an appropriate menstruum in which the salt is insoluble, then after separation of the salt, neutralizing with a base such as barium hydroxide or sodium hydroxide, to obtain the free base of formula I. Other salts may then be formed from the free base by reaction with an equivalent of acid.

The new compounds of this invention are central nervous system depressants and may be used as tranquilizers or ataractic agents for the relief of anxiety and tension states, for example, in mice, cats, rats, dogs and other mammalian species, in the same manner as chlordiazepoxide. For this purpose a compound or mixture of compounds of formula I, or non-toxic, physiologically acceptable acid addition salt thereof, may be administered orally or parenterally in a conventional dosage form such as tablet, capsule, injectable or the like. A single dose, or preferably two to four divided daily doses, provided on a basis of about 1 to 50 mg. per kilogram per day, preferably about 2 to 15 mg. per kilogram per day, is appropriate. These may be conventionally formulated in an oral or parenteral dosage form by compounding about 10 to 250 mg. per unit of dosage with conventional vehicle, excipient, binder, preservative, stabilizer, flavor or the like as called for by accepted pharmaceutical practice.

The new compounds also increase the intracellular concentration of adenosine-3′,5′-cyclic monophosphate, and thus by the administration of about 1 to 100 mg/kg/day, preferably about 10 to 50 mg/kg., in single or two to four divided dosages in conventional oral or parenteral dosage forms such as those described above may be used to alleviate the symptoms of asthma.

The new compounds of this invention, in addition, have anti-inflammatory and analgesic properties and are useful as anti-inflammatory agents, for example, to reduce local inflammatory conditions such as those of an edematous nature or resulting from proliferation of connective tissue in various mammalian species such as rates, dogs and the like when given orally in dosages of about 5 to 50 mg/kg/day, preferably 5 to 25 mg/kg/day, in single or two to four divided dosages, as indicated by the carageenan edema assay in rats. The active substance may be utilized in compositions such as tablets, capsules, solutions or suspensions containing up to about 300 mg. per unit of dosage of a compound or mixture of compounds of formula I or physiologically acceptable acid addition salt thereof. They may be compounded in conventional manner with a physiologically acceptable vehicle or carrier, excipient, binder, preservative, stabilizer, flavor, etc. as called for by accepted pharmaceutical practice. Topical preparations containing about 0.01 to 3 percent by weight of active substance in a lotion, salve or cream may also be used.

The following examples are illustrative of the invention. All temperatures are on the centigrade scale.

EXAMPLE 1

4-amino-1-ethyl-1H-pyrazolo[3,4-b]pyridine-5-carboxylic acid ethyl ester a. [[(1-ethyl-5-pyrazolyl)amino]methylene]malonic acid diethyl ester 245 g. 1-ethyl-5-aminopyrazole (2.2 mole) and 476 g. ethoxymethylene malonic acid diethyl ester (2.2 mol.) are heated to 120° (bath temperature) for 2 hours with stirring. The ethanol formed by this reaction is removed by means of a water aspirator. Then vacuum distillation (b.p. 0.1 154°–160°) yields 520 g. (84% of theory) of a quick crystallizing oil of [[(1-ethyl-5-pyrazolyl)amino]methylene] malonic acid diethyl ester, m.p. 50°–53°.

The compound is recrystallized from N-hexane, m.p. 55°–57°.

The hydrochloride salt is formed by treating the above product with dilute ethanolic hydrogen chloride solution.

b.
1-Ethyl-4-hydroxy-1H-pyrazolo[3,4-b]pyridine-5-carboxylic acid and ethyl ester 253 g. [[(1-ethyl-5-pyrazolyl)amino]methylene] malonic acid diethyl ester (0.09 mol.) are dissolved in 770 g. of diphenyl ether. The reaction mixture is heated to 235°–250° (bath temperature) and allowed to react at this temperature for 1–2 hours while the resulting ethanol is continuously distilled off. The last amount of alcohol is removed by means of a water aspirator. The diphenyl ether is separated by distillation with a fractionating column in vacuo. The 1-ethyl-4-hydroxy-1H-pyrazolo[3,4-b]-pyridine-5-carboxylic acid ethyl ester is obtained at b.p. 0.05 115°–120°, yield 195 g. = 92% of theory, m.p. 85°–87°. The compound is recrystallized from benzene (90° to 100°), m.p. 87°–89°. Hydrolysis of this product with aqueous sodium hydroxide yields 1-ethyl-4-hydroxy-1H-pyrazolo[3,4-b]pyridine-5-carboxylic acid, m.p. 201°–202°.

c.
4-Ethoxy-1-ethyl-1H-pyrazolo[3,4-b]pyridine-5-carboxylic acid and ethyl ester In a solution of 259 g. (1.1 mol.) 1-ethyl-4-hydroxy-1H-pyrazolo[3,4-b]pyridine-5-carboxylic acid ethyl ester in 1700 ml. dimethylformamide, 400 g. of well pulverized potassium carbonate and 300 g. of ethyl iodide are introduced. The reaction mixture is stirred for 7 hours at 65° and filtered under suction, while hot, from excess potassium carbonate. Upon standing overnight, 165 g. of 4-ethoxy-1-ethyl-1H-pyrazolo[3,4-b]oyridine-5-carboxylic acid ethyl ester crystallize out of the solution, m.p. 112°–115°. After evaporation of the mother liquor, an additional 80 g. are obtained. The total yield amounts to 85% of theory. The compound is recrystallized from benzene (90°–100°), m.p. 113°–115°.

By hydrolyzing this product as in part (b) 4-ethoxy-1-ethyl-1H-pyrazolo[3,4-b]pyridine-5-carboxylic acid is obtained, m.p. 198°–199°.

d.
4-amino-1-ethyl-1H-pyrazolo[3,4-b]pyridine-5-carboxylic acid ethyl ester 10.4 g. of 4-ethoxy-1-ethyl-1H-pyrazolo[3,4-b]pyridine-5-carboxylic acid ethyl ester (0.04 mol.) and 50 ml. of an alcoholic solution of ammonia (56.5 g. of ammonia in 1000 ml. of ethanol) are heated in an autoclave at 65° for 15 hours. After cooling the reaction mixture to room temperature, the solid product is filtered under suction, washed with a small amount of ethanol and dried at 80°. The 4-amino-1-ethyl-1H-pyrazolo[3,4-b]pyridine-5-carboxylic acid ethyl ester, m.p. 180° weighs 7.4 g. (90%), and is recrystallized from absolute ethanol, m.p. 181°–182°. By evaporation of the mother liquor an additional 0.8 g. of crude product is isolated. Total yield 96%.

EXAMPLE 2
4-Butylamino-1-ethyl-1H-pyrazolo[3,4-b]pyridine-5-carboxylic acid ethyl ester a.
4-Chloro-1-ethyl-1H-pyrazolo[3,4-b]pyridine-5-carboxylic acid, ethyl ester A mixture of 23.5 g. 1-ethyl-4-hydroxy-1H-pyrazolo-[3,4-b]pyridine-5-carboxylic acid ethyl ester (0.1 mol.) and 150 ml. of phosphorous oxychloride is refluxed for 4 hours. Subsequently the excess phosphorous oxychloride is removed by means of vacuum distillation. As soon as the phosphorous oxychloride has been removed, the oily residue solidifies on cooling. It is treated with water and filtered under suction (24.5 g.), m.p. 55°–60°. The 4-chloro compound is recrystallized from N-hexane (22.5 g. = 87%), m.p. 62°.

b.
4-Butylamino-1-ethyl-1H-pyrazolo[3,4-b]pyridine-5-carboxylic acid ethyl ester.

To a solution of 5.08 g. of 4-chloro-1-ethyl-1H-pyrazolo-[3,4-b]pyridine-5-carboxylic acid ethyl ester (0.02 mol.) in 20 ml. of benzene are added 2.92 g. of n-butylamine (0.04 mol.). This mixture is kept at room temperature for 3 days. After this time, the separated butylamine hydrochloride is filtered under suction and the filtrate is evaporated in vacuo to dryness. The residue, 4-butylamino-1-ethyl-1H-pyrazolo[3,4-b]pyridine-5-carboxylic acid ethyl ester, is recrystallized from hexane, m.p. 82°–83°. The total yield amounts to 5.3 g. = 91.5% of theory.

EXAMPLE 3
1-Ethyl-4-phenylamino-1H-pyrazolo[3,4-b]pyridine-5-carboxylic acid and ethyl ester 10.1 g. of 4-chloro-1 ethyl-1H-pyrazolo[3,4-b]pyridine-5-carboxylic acid ethyl ester [prepared as in Example 2a (0.04 mol.)] and 20 ml. of aniline are stirred for 2 hours at 110°. The excess aniline is distilled off in vacuo and the residue is treated with sodium bicarbonate solution. The mixture is then extracted three times with 100 ml. of chloroform, the chloroform layer is separated, dried over sodium sulfate and concentrated in vacuo. The residue solidifies on cooling and is recrystallized from ethanol-water. The yield of 1-ethyl-4-phenylamino-1H-pyrazolo-[3,4-b]pyridine-5-carboxylic acid ethyl ester is 9.2 g. = 75%, m.p. 96°–97°. Hydrolysis of this product with aqueous sodium hydroxide yields 1-ethyl-4-phenylamino-1H-pyrazolo[3,4-b]-pyridine-5-carboxylic acid, m.p. 237°–38°.

EXAMPLE 4
1-Ethyl-4-pyrrolidino-1H-pyrazolo[3,4-b]pyridine-5-carboxylic acid, ethyl ester hydrochloride By treating the 1-ethyl-4-chloro-1H-pyrazolo[3,4-b]pyridine-5-carboxylic acid ethyl ester of Example 2a with pyrrolidine and benzene as in Example 2b, 1-ethyl-1H-4-pyrrolidino-1H-pyrazolo [3,4-b]pyridine-5-carboxylic acid ethyl ester is obtained. Yield = 92%, m.p. 105°–106° (cyclohexane).

The hydrochloride is formed by adding to a solution containing 5 g. of the above obtained 4-pyrrolidino-compound in 50 ml. of anhydrous ether, with cooling, 3.5 ml. of an alcoholic solution of hydrogen chloride (6.3 N). A white crystalline precipitate forms immediately. The mixture is filtered and washed with anhydrous ether. The product is allowed to dry at 90°. Yield = 5.3 g. (93.5%), m.p. 190°–191°.

The following compounds are prepared by the procedure of Example 1, 2 or 3:

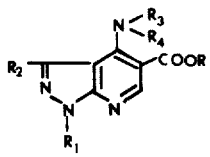

| Example | $R_1$ | $R_2$ | $R_3$ | $R_4$ |
|---|---|---|---|---|
| 5 | $CH_3-CH_2$ | $CH_3$ | $CH_3-CH_2$ | $CH_3-CH_2$ |
| 6 | $CH_3-CH_2$ | H | $-CH_2-CH_2-N(CH_3)-CH_2-CH_2-CH_2-$ | |
| 7 | $CH_3-CH_2$ | H | $-(CH_2)_3N(C_2H_5)_2$ | H |
| 8 | $CH_3-CH_2$ | H | $-CH_2-CH_2-CH_2-CH_2-CH_2-$ | |
| 9 | $CH_3-CH_2$ | H | $CH_3-CH_2$ | $CH_3-CH_2$ |
| 10 | $CH_3-CH_2$ | H | $-(CH_2)_2N(C_2H_5)_2$ | H |
| 11 | $CH_3-CH_2$ | $CH_3$ | H | H |
| 12 | $CH_3-CH_2$ | H | $-C(CH_3)=CH-C(CH_3)=N-$ | |
| 13 | $CH_3-CH_2$ | $CH_3$ | $-CH_2-CH_2-CH_2-CH_2-CH_2-$ | |
| 14 | $CH_3-CH_2$ | $CH_3$ | $-CH_2-CH_2-CH_2-CH_2-$ | |
| 15 | $CH_3-CH_2$ | H | $-CH_2-CH_2-N(CH_2-CH_2-OH)-CH_2-CH_2-$ | |
| 16 | $CH_3-CH_2$ | H | H | H |
| 17 | $CH_3$ | H | $-(CH_2)_3CH_3$ | H |
| 18 | $CH_3$ | H | $-(CH_2)_3CH_3$ | H |
| 19 | $CH_3-CH_2$ | H | $-(CH_2)_3CH_3$ | H |

| Example | R | Salt | Recrystallization Medium | MP |
|---|---|---|---|---|
| 5 | $C_2H_5$ | HCl | ethyl acetate/ether | 102° |
| 6 | $C_2H_5$ | 2 HCl | alcohol abs. | 232–35° dec. |
| 7 | $C_2H_5$ | 2 HCl | ethyl acetate/alcohol abs. | 195–96° dec. |
| 8 | $C_2H_5$ | HCl | ethyl acetate/alcohol abs. | 174–75° dec. |
| 9 | $C_2H_5$ | HCl | ethyl acetate | 104–05° |
| 10 | $C_2H_5$ | 2 HCl | ethyl acetate/alcohol abs. | 157–58° dec. |
| 11 | $C_2H_5$ | — | alcohol | 177–79° |
| 12 | $C_2H_5$ | — | hexane | 61–63° |
| 13 | $C_2H_5$ | HCl | ethyl acetate | 152–53° dec. |
| 14 | $C_2H_5$ | HCl | ethyl acetate/alcohol abs. | 199–200° |
| 15 | $C_2H_5$ | — | cyclohexane/alcohol | 103–04° |
| 16 | H | — | alcohol | 248–49° |
| 17 | $C_2H_5$ | HCl | ethyl acetate/ether | 180–81° |
| 18 | H | — | alcohol | 217–18° |
| 19 | H | — | alcohol | 213–14° |

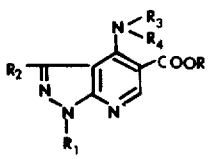

| Example | $R_1$ | $R_2$ | $R_3$ | $R_4$ |
|---|---|---|---|---|
| 20 | $CH_3-CH_2$ | H | $-CH=C(CH_3)-C(CH_3)=C-NH-$ | |
| 21 | $C_6H_5-CH_2$ | H | $-(CH_2)_3CH_3$ | H |
| 22 | $CH_3-CH_2$ | H | $-C_6H_4-CF_3$ | H |
| 23 | $CH_3-CH_2$ | H | $-C_6H_4-CF_3$ | H |
| 24 | $CH_3-CH_2$ | H | $-CH_2-CH(CH_3)_2$ | H |
| 25 | $CH_3-CH_2$ | H | $-CH(CH_3)-$ | H |

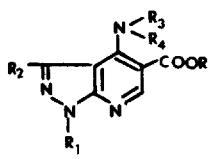

| Example | $R_1$ | $R_2$ | $R_3$ | $R_4$ |
|---|---|---|---|---|
| 26 | $CH_3-CH_2$ | H | $-CH_2-C_6H_5$ (with $CH_2-CH_3$ on ring) | H |
| 27 | $CH_3-CH_2$ | H | $-CH_2-CH_2-C_6H_5$ | H |
| 28 | $CH_3-CH_2$ | $CH_3$ | $-(CH_2)_3CH_3$ | H |
| 29 | $CH_3-CH_3$ | H | $-(CH_2)_2CH_3$ | H |
| 30 | $CH_3-CH_3$ | H | $-CH(CH_3)_2$ | H |
| 31 | $CH_3-CH_3$ | H | $-(CH_2)_5CH_3$ | H |
| 32 | $CH_3-CH_3$ | $CH_3$ | $-(CH_2)_3CH_3$ | H |
| 33 | $CH_3-CH_3$ | H | $-C(CH_3)_3$ | H |

| Example | R | Salt | Recrystallization Medium | MP |
|---|---|---|---|---|
| 20 | $C_2H_5$ | — | alcohol abs. | 155–57° |
| 21 | $C_2H_5$ | — | alcohol | 97–98° |
| 22 | $C_2H_5$ | — | alcohol/water | 101.5–102° |
| 23 | H | — | acetic acid | 250° |
| 24 | $C_2H_5$ | — | hexane | 92–93° |
| 25 | $C_2H_5$ | HCl | ethyl acetate | 171–72° |
| 26 | $C_2H_5$ | — | hexane | 128–29° |
| 27 | $C_2H_5$ | — | alcohol | 97–99° |
| 28 | $C_2H_5$ | HCl | ethyl acetate | 152–53° |
| 29 | $C_2H_5$ | HCl | ethyl acetate/alcohol | 174–75° |
| 30 | $C_2H_5$ | HCl | ethyl acetate/alcohol | 191–92° |
| 31 | $C_2H_5$ | — | hexane | 58–59° |
| 32 | H | — | alcohol | 200–01° |
| 33 | $C_2H_5$ | — | hexane | 117–19° |

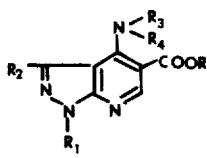

| Example | $R_1$ | $R_2$ | $R_3$ | $R_4$ |
|---|---|---|---|---|
| 34 | $CH_3-(CH_2)_3$ | H | $-(CH_2)_3CH_3$ | H |
| 35 | $CH_3-CH_2$ | H | 2,6-dimethylphenyl | H |
| 36 | $CH_3-CH_2$ | H | 2,6-dimethylphenyl | H |
| 37 | $CH_3-CH_2$ | H | 2-COOH-phenyl | H |
| 38 | $CH_3(CH_2)_3$ | $CH_3$ | $-(CH_2)_3CH_3$ | H |
| 39 | $C_6H_5$ | H | $-(CH_2)_3CH_3$ | H |

| Example | R | Salt | Recrystallization Medium | MP |
|---|---|---|---|---|
| 34 | $C_2H_5$ | HCl | ethyl acetate | 174–75° |
| 35 | $C_2H_5$ | — | alcohol/water | 99–101° |
| 36 | H | — | alcohol | 212–13° |
| 37 | $C_2H_5$ | — | alcohol/water | 193–96° |
| 38 | $C_2H_5$ | HCl | ethyl acetate/benzene | 128–30° |
| 39 | $C_2H_5$ | — | cyclohexane | 96–98° |

-continued

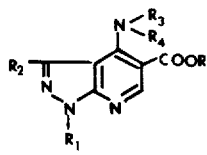

| Example | $R_1$ | $R_2$ | $R_3$ | $R_4$ |
|---|---|---|---|---|
| 40 | $CH_3-CH_2-$ | H | $CH_3-(CH_2)_3-$ | $CH_3-$ |
| 41 | $CH_3-CH_2-$ | H | Cl-C$_6$H$_4$-CO- | H |
| 42 | $CH_3-CH_2-$ | H | Cl-C$_6$H$_4$-CO- | $CH_3-(CH_2)_3-$ |
| 43 | $CH_3-CH_2-$ | $CH_3$ | $CH_3$-C$_6$H$_4$-$SO_2-$ | $Na^+$ |
| 44 | $CH_3-CH_2-$ | H | $CH_2=CH-CH_2-$ | H |
| 45 | $CH_3-CH_2-$ | H | C$_6$H$_4$-$NH_2$ | H |
| 46 | $CH_3-CH_2-$ | H | $CH_3-(CH_2)_3-$ | H |
| 47 | $CH_3-CH_2-CH_2-$ | C$_6$H$_5$ | $CH_3-(CH_2)_3-$ | H |
| 48 | $CH_3-CH_2-$ | $CH_3$ | $-CH_2-CH_2-N(CH_3)-CH_2-CH_2-$ | |
| 49 | H | H | $CH_3CO$ | H |

| Example | R | Salt | Recrystallization Medium | M.P. |
|---|---|---|---|---|
| 40 | $CH_3-CH_2-$ | — | petrol ether | 46–48° |
| 41 | $CH_3-CH_2-$ | — | dimethylformamide | 157–60° |
| 42 | $CH_3-CH_2-$ | — | benzene | 60° |
| 43 | $CH_3-CH_2-$ | sodium | | 296–98° |
| 44 | $CH_3-CH_2$ | — | benzene | 90–92° |
| 45 | $CH_3-CH_2-$ | — | methanol | 131–33° |
| 46 | $CH_3-(CH_2)_n-$ | — | hexane | 49–51° |
| 47 | $CH_3-CH_2$ | ½ oxalate | hexane | 107–09° |
| 48 | $CH_3-CH_2$ | dihydrochloride | alcohol/ethyl acetate | 174–76° |
| 49 | H | | | 206° |

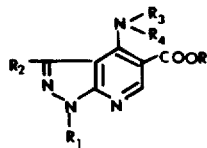

| Example | $R_1$ | $R_2$ | $R_3$ | $R_4$ |
|---|---|---|---|---|
| 50 | H | $CH_3$ | $CH_3-(CH_2)_3-$ | H |
| 51 | Cl-C$_6$H$_4$-CO- | $CH_3$ | $CH_3-(CH_2)_3-$ | H |
| 52 | H | $CH_3$ | $CH_3-(CH_2)_3-$ | H |
| 53 | H | H | $CH_3-(CH_2)_3-$ | H |
| 54 | H | H | C$_6$H$_5$ | H |
| 55 | H | H | $CH_3-(CH_2)_3-$ | H |

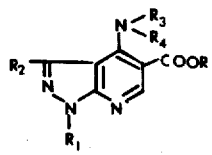

| Example | R | Salt | Recrystallization Medium | M.P. |
|---|---|---|---|---|
| 50 | CH$_3$—CH$_2$— | — | methanol | 174° |
| 51 | CH$_3$—CH$_2$— | — | n-butanol | 140° |
| 52 | H | — | dimethylformamide | 245–50° |
| 53 | CH$_3$—CH$_2$— | — | ether | 175° |
| 54 | CH$_3$—CH$_2$— | — | ethylacetate | 235° |
| 55 | H | — | acetic acid | 255° |

EXAMPLE 56

4-Butylamino-1H-pyrazolo[3,4-b]pyridine-5-carboxylic acid ethyl ester a.

[[[1-(2-furyl)methyl-5-pyrazolyl]amino]methylene]-malonic acid diethyl ester 163 g. of 1-(2-furyl)methyl-5-aminopyrazole (1 mol.) and 216 g. of ethoxymethylene malonic acid diethyl ester (1 mol.) are heated to 130° (bath temperature) until the theoretical amount of alcohol is distilled off. The remaining oil, [[[1-(2-furyl)methyl-5-pyrazolyl]amino]methylene]malonic acid diethy ester, is recrystallized from methanol, yield 280 g. (84%) m.p. 84°–86°.

b.

4-hydroxy-1-(2-furyl)methyl-1H-pyrazolo[3,4-b]pyridine-5-carboxylic acid ethyl ester 250 g. of [[[1-(2-furyl)methyl-5-pyrazolyl]amino]-methylene]-malonic acid diethyl ester (0.75 mol.) are dissolved in 1 liter of diphenyl ether and heated to 240° for 2 hours. The ethanol formed is continuously distilled off. The solvent is removed in vacuo. The 4-hydroxy-1-(2-furyl)methyl-1H-pyrazolo[3,4-b]-pyridine-5-carboxylic acid ethyl ester remains and is recrystallized from methanol, yield 248 g. (86%), m.p. 103°–106°.

c.

4-Ethoxy-1-(2-furyl)methyl-1H-pyrazolo[3,4-b]pyridine-5-carboxylic acid ester 300 g. of 4-hydroxy-1-(2-furyl)methyl-1H-pyrazolo[3,4-b]-pyridine-5-carboxylic acid ethyl ester (1.05 mol.) are dissolved in 1 liter of dimethylformamide. 210 g. of potassium carbonate (1.5 mol.) and 233 g. of ethyl iodide are added. The mixture is heated at 60° with continuous stirring for 10 hours. The excess potassium carbonate is filtered off. On addition of 500 ml. of water, 4-ethoxy-1-(2-furyl)methyl-1H-pyrazolo[3,4-b]pyridine-5-carboxylic acid ethyl ester precipitates and is recrystallized from methanol, yield 280 g. (85%), m.p. 93°–96°.

d. 4-Ethoxy-1H-pyrazolo[3,4-b]pyridine carboxylic acid ethyl ester 31.5 g. of 4-ethoxy-1-(2-furyl)methyl-1H-pyrazolo[3,4-b]-pyridine-5-carboxylic acid ethyl ester (0.1 mol.) and 20 g. of selenium dioxide (0.18 mol.) are suspended in 100 ml. diethyleneglycol dimethylether. The mixture is heated with stirring at 160° and a few drops of water are added. The temperature is kept for 1.5 hours. After cooling, 100 ml. of water are added and the mixture is neutralized with a dilute solution of aqueous ammonia. Yellow crystals are formed, which yield on recrystallization from methanol 15.8 g. of 4-ethoxy-1H-pyrazolo[3,4-b]pyridine-5-carboxylic acid ethyl ester (67%), m.p. 180°.

e.

4-Butylamino-1H-pyrazolo[3,4-b]pyridine-5-carboxylic acid ethyl ester 2.35 g. of 4-ethoxy-1H-pyrazolo[3,4-b]pyridine-5-carboxylic acid ethyl ester (0.01 mol.) are treated with 2.2 g. of butylamine (0.03 mol.) at 90° for 1 hour. After this period the mixture is cooled, diluted with 20 ml. of water and the white crystalline precipitate is filtered off. Recrystallization from diethyl ether yields 1.7 g. of 4-butylamino-1H-pyrazolo[3,4-b]pyridine-5-carboxylic acid ethyl ester (72%), m.p. 181°.

EXAMPLE 57

4-Diethylamino-1H-pyrazolo[3,4-b]pyridine-5-carboxylic acid ethyl ester a.

[[[1-(4-picolyl)-5-pyrazolyl]amino]methylene]malonic acid diethyl ester 174 g. of 1-(4-picolyl)-5-aminopyrazole and 216 g. of ethoxymethylene malonic acid diethyl ester are heated with stirring at 140°, until the theoretical amount of alcohol has distilled off. The reaction mixture crystallizes on cooling. Recrystallization from ethyl acetate yields 220 g. of [[[1-(4-picolyl)-5-pyrazolyl]amino]methylene]malonic acid diethyl ester (65%), m.p. 95°–97°.

b.

4-hydroxy-1-(4-picolyl)-1H-pyrazolo[3,4-b]pyridine-5-carboxylic acid ethyl ester 86 g. of [[[1-(4-picolyl)-5-pyrazolyl]amino]methylene]malonic acid diethyl ester (0.25 mol.) are heated at 240° for 15 minutes. The dark oil is cooled and 200 ml. of methanol are added. 4-hydroxy-1-(4-picolyl)-1H-pyrazolo[3,4-b]pyridine-5-carboxylic acid ethyl ester crystallizes on standing, yield 33 g. (44%), m.p. 140°.

c. 4-hydroxy-1H-pyrazolo[3,4-b]pyridine-5-carboxylic acid ethyl ester 3 g. of 4-hydroxy-1-(4-picolyl)-1H-pyrazolo[3,4-b]-pyridine-5-carboxylic acid ethyl ester (0.01 mol.) are dissolved in 20 ml. of acetic acid. 2.2 g. of selenium dioxide (0.02 mol.) and 2-3 drops of water are added. The mixture is refluxed for 30 minutes and then filtered off. 4-hydroxy-1H-pyrazolo[3,4-b]pyridine-5-carboxylic acid ethyl ester precipitates on cooling. Recrystallization from acetic acid yields 1,8 g. (87%), m.p. 275°.

d. 4-ethoxy-1H-pyrazolo[3,4-b]pyridine-5-carboxylic acid ethyl ester 4.1 g. of 4-hydroxy-1H-pyrazolo[3,4-b]pyridine-5-carboxylic acid ethyl ester (0.02 mol.), 5.6 g. of potassium carbonate (0.04 mol.) and 3.5 g. of ethyl iodide (0.022 mol.) are heated in 30 ml. of dimethylformamide with stirring for 10 hours at 60°. After this time, the excess potassium carbonate is filtered off and 30 ml of water are added. 4-Ethoxy-1H-pyrazolo[3,4-b]pyridine-5-carboxylic acid ethyl ester precipitates and is recrystallized from methanol, yield 2 g. (42.5%), m.p. 180°.

e. 4-Diethylamino-1H-pyrazolo[3,4-b]pyridine-5-carboxylic acid ethyl ester 1.2 g. of 4-ethoxy-1H-pyrazolo[3,4-b]pyridine-5-carboxylic acid ethyl ester (0.05 mol.) and 1.4 g. of diethylamine (0.02 mol.) are heated at 70° for 30 minutes. The addition of 5 ml. of water precipitates 4-diethylamino-1H-pyrazolo[3,4-b]pyridine-5-carboxylic acid ethyl ester which is filtered off and washed with water, yield 0.8 g. (61%), m.p. 186°.

EXAMPLE 58

4-Butylamino-1H-pyrazolo[3,4-b]pyridine-5-carboxylic acid 2.6 g. of 4-butylamino-1H-pyrazolo[3,4-b]pyridine-5-carboxylic acid ethyl ester (0.01 mol.) are treated with 1.1 g. of sodium hydroxide in 30 ml. of ethanol for 20 hours at room temperature. The solvent is removed in vacuo and the residue is dissolved in 10 ml. of water. On acidification with acetic acid 4-butylamino-1H-pyrazolo[3,4-b]pyridine-5-carboxylic acid solidifies and is filtered off. The product is purified by recrystallization from acetic acid, yield 1.9 g. (82%), m.p. 225°.

EXAMPLE 59

4-Butylamino-3-methyl-1H-pyrazolo[3,4-b]pyridine-5-carboxylic acid ethyl ester a. [[(3-methyl-5-isoxazolyl)amino]methylene]malonic acid diethyl ester 112.5 g. of 3-methyl-5-aminoisoxazole (1.14 mol.) and 248 g. of ethoxymethylene malonic acid diethyl ester (1.14 mol.) are heated with stirring for 45 minutes at 130°. After this period, ethanol is removed under reduced pressure. The residue solidifies on cooling and is recrystallized from ethanol, m.p. 134°–136°, yield 245 g. (80%).

b. 4-hydroxy-3-methylisoxazolo[3,4-b]pyridine-5-carboxylic acid ethyl ester 50 g. of [[(3-methyl-5-isoxazolyl)amino]methylene]-malonic acid diethyl ester (0.19 mol.) are quickly added to 250 ml. of vigorously refluxing diphenyl ether. After 7 minutes, the reaction mixture is cooled rapidly. The solvent is distilled off in vacuo and the oily residue crystallizes after adding 100 ml. of methanol. Recrystallization from methanol yields 20 g. (48%) of 4-hydroxy-3-methylisoxazolo[3,4-b]pyridine-5-carboxylic acid ethyl ester, m.p. 150°–152°.

c. 4-ethoxy-3-methylisoxazolo[3,4-b]pyridine-5-carboxylic acid ethyl ester 22.2 g. of 4-hydroxy-3-methylisoxazolo[3,4-b]pyridine-5-carboxylic acid ethyl ester (0.1 mol.) are dissolved in 150 ml. of ethanol and 28 g. of potassium carbonate (0.2 mol.). 31 g. of ethyl iodide (0.2 mol.) are added. The mixture is heated with stirring for 6 hours. The hot solution is filtered and the solvent evaporated. The oily residue yields on crystallization with methanol 18.2 g. of 4-ethoxy-3-methylisoxazolo[3,4-b]pyridine-5-carboxylic acid ethyl ester. (73%), m.p. 62°.

d. 4-butylamino-3-methylisoxazolo[3,4-b]pyridine-5-carboxylic acid ethyl ester 25 g. of 4-ethoxy-3-methylisoxazolo[3,4-b]pyridine-5-carboxylic acid ethyl ester (0.113 mol.) are dissolved in 100 ml. of benzene and after adding 8 g. of butylamine (0.23 mol.), the solution is refluxed for 12 hours. The solvent is distilled off and the residual 4-butylamino-3-methylisoxazolo[3,4-b]pyridine-5-carboxylic acid ethyl ester is recrystallized from ligroin, m.p. 60°, yield 23.5 g. (85%).

e. 3-acetyl-4-butylamino-2-hydroxypyridine-5-carboxylic acid ethyl ester 300 g. of 4-butylamino-3-methylisoxazolo[3,4-b]pyridine-5-carboxylic acid ethyl ester (1.08 mol.) are dissolved in 0.5 l. of acetic acid, 1 g. of palladium on charcoal is added and the mixture is hydrogenated. After absorption of 24 l. of hydrogen, the reaction is stopped, the catalyst is filtered off and the solvent removed in vacuo. The remaining residue is treated for 7 hours at 100° with 0.5 l. of water with stirring. The reaction mixture is cooled and extracted 3 times with 200 ml. portions of chloroform. The organic layers are collected, dried over sodium sulfate and evaporated to dryness. Recrystallization of the oily residue yields 216 g. of 3-acetyl-4-butylamino-2-hydroxypyridine-5-carboxylic acid ethyl ester (72%), m.p. 134°–136°.

f. 4-butylamino-2-chloro-3-(α-chloro)vinylpyridine-5-carboxylic acid ethyl ester 66.5 g. of 3-acetyl-4-butylamino-2-hydroxypyridine-5-carboxylic acid ethyl ester (0.24 mol.), 250 ml. of phosphorus oxychloride and 1 ml. of pyridine are heated for 3 hours at 40° with stirring. After this period the temperature is raised to 70° and kept for 3 hours.

For 3 additional hours the mixture is agitated at 100°. The excess phosphorus oxychloride is removed in vacuo and the residual oil carefully neutralized with saturated sodium bicarbonate solution and then extracted three times with 300 ml. portions of ether. The ether layers are collected, dried over sodium sulfate and the solvent is distilled. 750 ml. of ligroin are added to the remaining oil and the suspension is agitated with 5 g. of charcoal under reflux for 30 minutes. After filtration and evaporation of the ligroin, a pale yellow oil is obtained which yields on crystallization with a methanol/water mixture 46 g. of 4-butylamino-2-chloro-3-(α-chloro)vinylpyridine-5-carboxylic acid ethyl ester (59%), m.p. 41°–42°.

g.
4-butylamino-3-methyl-1H-pyrazolo[3,4-b]pyridine-5-carboxylic acid ethyl ester To a mixture of 16 g. of hydrazine hydrate (0.32 mol.) in 200 ml. of alcohol, 31.6 g. of 4-butylamino-2-chloro-3-(α-chloro)-vinylpyridine-5-carboxylic acid ethyl ester (0.1 mol.) in 50 ml. of alcohol are dropped in within 15 minutes with stirring at 30°. The temperature is maintained for 2 additional hours and then raised to 80°. After 8 hours, the solvent is distilled off and the crystalline residue is treated with 100 ml. of water. Filtration yields 22.6 g. of 4-butylamino-3-methyl-1H-pyrazolo[3,4-b]-pyridine-5-carboxylic acid ethyl ester (82%), which is recrystallized from methanol, m.p. 172°–174°.

EXAMPLE 60 a.
4-Butylamino-3-methyl-1H-pyrazolo[3,4-b]pyridine-5-carboxylic acid 5 g. of 4-butylamino-3-methyl-1H-pyrazolo[3,4-b]pyridine-5-carboxylic acid ethyl ester (0.019 mol.) are dissolved in 30 ml. of alcohol and treated with 3.4 g. of potassium hydroxide (0.6 mol.) for 48 hours at 40°. After this period, the solvent is evaporated and the residue acidified with acetic acid. On addition of 30 ml. of water the 4-butylamino-3-methyl-1H-pyrazolo[3,4-b]pyridine-5-carboxylic acid crystallizes. Filtration and recrystallization from dimethylformamide yields 3.6 g. (77%), m.p. 245°–250°.

EXAMPLE 61

4-Butylamino-3-methyl-1H-pyrazolo[3,4-b]pyridine-5-carboxylic acid ethyl ester a.
3-acetyl-4-butylamino-2-chloropyridine-5-carboxylic acid ethyl ester 28 g. of 3-Acetyl-4-butylamino-2-hydroxypyridine-5-carboxylic acid ethyl ester (0.1 mol.) are dissolved in 200 ml. of dry benzene and agitated with 50 ml. of phosphorus oxychloride for 24 hours at 60°. After this time, the benzene and excess phosphorus halide are removed in vacuo, the residue carefully is neutralized with saturated sodium bicarbonate solution and extracted with ether. The combined ether layers are dried over sodium sulfate, and evaporated to dryness. Recrystallization of the residue from ligroin yields 2.5 g. of 3-acetyl-4-butylamino-2-chloropyridine-5-carboxylic acid ethyl ester, m.p. 140°.

b.
4-butylamino-3-methyl-1H-pyrazolo[3,4-b]pyridine-5-carboxylic acid ethyl ester 1.4 g. of 3-acetyl-butylamino-2-chloropyridine-5-carboxylic acid ethyl ester (0.005 mol.) are dissolved in 5 ml. of alcohol and 0.5 g. of hydrazine hydrate (0.01 mol.) are added. The mixture is refluxed for 5 hours. After this time, on addition of 10 ml. of water, 0.9 g. of 4-butylamino-3-methyl-1H-pyrazolo[3,4-b]pyridine-5-carboxylic acid ethyl ester crystallizes on cooling (69%), m.p. 172°–174°.

EXAMPLE 62

4-Butylamino-1H-pyrazolo[3,4-b]pyridine-5-carboxylic acid ethyl ester a.
4-butylamino-2-chloro-5-ethoxycarbonylpyridine-3-aldehyde The starting material 4-butylaminoisoxazolo[3,4-b]pyridine-5-carboxylic acid ethyl ester is obtained by the same procedure described in Example 59 using 5-aminoisoxazole instead of 3-methyl-5-aminoisoxazole.

26.3 g. of 4-butylaminoisoxazolo[3,4-b]pyridine-5-carboxylic acid ethyl ester (0.1 mol.) are dissolved in 100 ml. of alcohol, 1 g. of palladium on charcoal is added and the mixture is hydrogenated. After absorption of the theoretical amount of hydrogen, the reaction is stopped and the catalyst is filtered off. The solvent is removed in vacuo. To the remaining oily residue 100 ml. of phosphorus oxychloride are added. The reaction mixture is heated at 100° for 7 hours with stirring. The excess phosphorus oxychloride is distilled off and the residue is poured into ice water, followed by neutralization with saturated sodium bicarbonate solution. The aqueous phase is extracted three times with 200 ml. portions of chloroform. The organic layers are collected, dried over sodium sulfate and evaporated to dryness. Recrystallization yields 8 g. of 4-butylamino-2-chloro-5-ethoxycarbonylpyridine-3-aldehyde, m.p. 86°–88°, yield 28%.

4-butylamino-1H-pyrazolo[3,4-b]pyridine-5-carboxylic acid ethyl ester 2.8 g. of 4-butylamino-2-chloro-5-ethoxycarbonylpyridine-3-aldehyde (0.01 mol.) are dissolved in 10 ml. of alcohol and 1.5 g. of hydrazine hydrate (0.03 mol.) are added. The mixture is refluxed for 3 hours, cooled and diluted with 50 ml. of water. The crystalline precipitate of 4-butylamino-1H-pyrazolo[3,4-b]pyridine-5-carboxylic acid ethyl ester is filtered and recrystallized from diethyl ether, m.p. 181°, yield 2.2 g. (84%).

EXAMPLE 63

4-Butylamino-1,3-dimethyl-1H-pyrazolo[3,4-b]pyridine-5-carboxylic acid ethyl ester To a mixture of 4.6 g. of methylhydrazine (0.1 mol.) in 50 ml. of alcohol 10.5 g. of 4-butylamino-2-chloro-3-(α-chloro)-vinylpyridine-5-carboxylic acid ethyl ester (0.033 mol.), as obtained in Example 43, in 50 ml. of alcohol are dropped in within 15 minutes with stirring at 30°. The temperature is maintained for 2 additional hours and then raised to 80°. After 8 hours, the solvent is distilled off, and the crystalline residue is treated with 100 ml. of water. Filtration yields 7.2 g. of 4-butylamino-1,3-dimethyl-1H-pyrazolo[3,4-b]pyridineb.

5-carboxylic acid ethyl ester (75%) which is recrystallized from ligroin, m.p. 58°–60°.

The following additional compounds are produced by the procedure of the foregoing example by replacing the methylhydrazine with the appropriately R-substituted hydrazines:

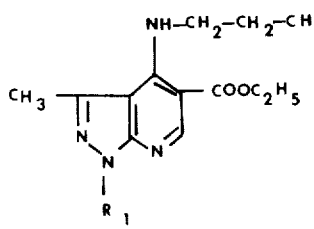

| Example | $R_1$ | Hydrochloride m.p. |
|---|---|---|
| 64 | $CH_3-CH_2$ | 152–153° |
| 65 | $CH_3-CH_2-CH_2$ | 118–121° |
| 66 | $CH_3-CH_2-CH_2-CH_2$ | 128–130° |

EXAMPLE 67

4-n-Butylamino-1-ethyl-6-methyl-1H-pyrazolo[3,4-b]pyridine-5-carboxylic acid ethyl ester a.

1-Ethyl-6-methyl-4-hydroxy-1H-pyrazolo[3,4-b]pyridine-5-carboxylic acid ethyl ester 51.1 g. of 1-ethyl-5-aminopyrazole (0.46 mol.) and 101 g. of acetomalonic acid ethyl ester (0.5 mol.) are added to 224 g. of polyphosphorous acid. The mixture is heated with stirring at 120° for 3 hours. After this period, the mixture is cooled, diluted with 1000 ml. of water and subsequently extracted twice with 300 ml. portions of chloroform. The chloroform layers are collected, dried over sodium sulfate and the solvent is distilled off. Recrystallization of the residue (67 g.) with petroleum ether yields 1-ethyl-6-methyl-4-hydroxy-1H-pyrazolo-[3,4-b]pyridine-5-carboxylic acid ethyl ester, m.p. 118°–120°.

b.

4-Chloro-1-ethyl-6-methyl-1H-pyrazolo[3,4-b]pyridine-5-carboxylic acid ethyl ester A mixture of 49.1 g. of 1-ethyl-6-methyl-4-hydroxy-1H-pyrazolo[3,4-b]pyridine-5-carboxylic acid ethyl ester (0.197 mol.) and 250 ml. of phosphorous oxychloride is refluxed for 4 hours. Then the excess phosphorous oxychloride is removed by vacuum distillation and the residue is treated with water. The 4-chloro compound (42 g.) is filtered under suction and recrystallized from n-hexane, m.p. 54°–56°.

c.

4-n-Butylamino-1-ethyl-6-methyl-1H-pyrazolo[3,4-b]pyridine-5-carboxylic acid ethyl ester To a solution of 10.7 g. of 4-chloro-1-ethyl-6-methyl-1H-pyrazolo[3,4-b]pyridine-5-carboxylic acid ethyl ester (0.04 mol.) in 50 ml. of benzene are added 5.85 g. of n-butylamine (0.08 mol.). The mixture is kept at room temperature for 4 days. After this period, the precipitated butylamine hydrochloride is filtered under suction and the filtrate is evaporated in vacuo to dryness. The residue, 4-n-butylamino-1-ethyl-6-methyl-1H-pyrazolo[3,4-b]-pyridine-5-carboxylic acid ethyl ester, is recrystallized from n-hexane, m.p. 75°–77°, yield 9.0 g.

EXAMPLE 68

4-n-Butylamino-1-ethyl-3,6-dimethyl-1H-pyrazolo[3,4-b]pyridine-5-carboxylic acid ethyl ester hydrochloride By substituting an equivalent amount of 1-ethyl-3-methyl-5-aminopyrazole for the 1-ethyl-5-aminopyrazole in the procedure of Example 67a, 1-ethyl-3,6-dimethyl-4-hydroxy-1H-pyrazolo[3,4-b]pyridine-5-carboxylic acid ethyl ester, m.p. 75°–77°, is obtained. This is then converted via the 4-chloro compound to the 4-n-butylamino-1-ethyl-3,6-dimethyl-1H-pyrazolo-[3,4-b]pyridine-5-carboxylic acid ethyl ester (according to the procedure of Examples 67b and 67c). The resulting oil dissolved in anhydrous ether forms with an alcoholic solution of hydrogen chloride the hydrochloride salt, m.p. 153°–154° (ethyl acetate).

What is claimed is:

1. A compound of the formula

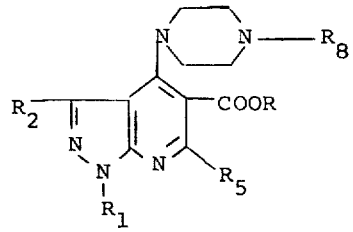

wherein R is hydrogen or alkyl up to 12 carbon atoms; $R_1$ is hydrogen, lower alkyl, phenyl or phenyl-lower alkyl; $R_2$ is hydrogen, phenyl or lower alkyl, $R_5$ is hydrogen, lower alkyl, phenyl or phenyl-lower alkyl and $R_8$ is hydrogen, lower alkyl or hydroxy-lower alkyl, or physiologically acceptable acid addition salts thereof.

2. A compound as in claim 1 wherein $R_5$ is hydrogen.

3. A compound as in claim 1 wherein $R_1$ is lower alkyl and $R_5$ is hydrogen.

4. A compound as in claim 1 wherein R is hydrogen or lower alkyl, $R_1$ is hydrogen, $C_1$—$C_3$ alkyl, phenyl or benzyl, $R_2$ is hydrogen or $C_1$—$C_3$ alkyl, $R_5$ is hydrogen or methyl and $R_8$ is hydrogen, $C_1$—$C_3$ alkyl or hydroxyethyl, or physiologically acceptable acid addition salts thereof.

5. A compound as in claim 1 wherein R, $R_1$ and $R_8$ each is lower alkyl and $R_2$ and $R_5$ each is hydrogen.

6. A compound as in claim 5 wherein R and $R_1$ each is ethyl and $R_8$ is methyl.

7. A compound as in claim 1 wherein R and $R_1$ each is lower alkyl, $R_2$ and $R_5$ each is hydrogen and $R_8$ is hydroxy-lower alkyl.

8. A compound as in claim 7 wherein R and $R_1$ each is ethyl and $R_8$ is hydroxyethyl.

9. A compound as in claim 1 wherein R, $R_1$, $R_2$ and $R_8$ each is lower alkyl and $R_5$ is hydrogen.

10. A compound as in claim 9 wherein R and $R_1$ each is ethyl and $R_2$ and $R_8$ each is methyl.

* * * * *